3,180,859
DERIVATIVES OF DECOYININE AND PROCESS FOR PREPARING SAME
Herman Hoeksema, Kalamazoo, Mich., assignor to The Upjohn Company, Kalamazoo, Mich., a corporation of Delaware
No Drawing. Filed Dec. 5, 1962, Ser. No. 242,375
13 Claims. (Cl. 260—211.5)

This invention relates to novel compositions of matter and to a process for the preparation thereof, and is particularly directed to novel compounds derived from the antibiotic decoyinine and to processes for producing the same. More particularly, the invention relates to novel compounds having the formula:

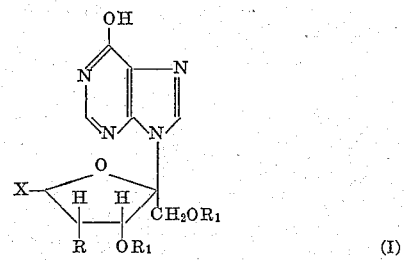

wherein X is $CH_2=$ or $CH_3$; R is hydrogen or $OR_1$ when X is $CH_3$, and $OR_1$ when X is $CH_2=$; and $R_1$ is hydrogen.

The novel compounds of the invention are obtained by treating with nitrous acid compounds having the formula:

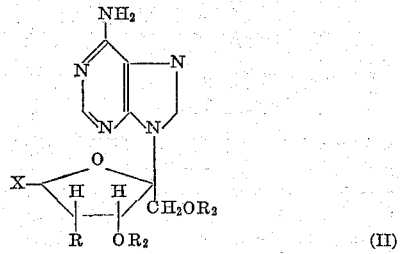

wherein X and R have the values previously described and $R_2$ is a saturated hydrocarbon acyl, for example, alkanoyl, cycloalkanolyl, aralkanoyl, and aroyl, of not more than eight carbon atoms, to give a compound of Formula I wherein $R_1$ equals $R_2$ and deacylating to give a compound of Formula I wherein $R_1$ is as given above, X and R in both instances being as given above. For example, upon treating compounds IIA ($X=CH_2=$, $R=OR_2$, $R_2=$—$COCH_3$), IIB ($X=CH_3$, $R=OR_2$, $R_2=$—$COCH_3$), and IIC ($X=CH_3$, $R=H$, $R_2=$—$COCH_3$)

which have been given the trivial names decoyinine triacetate, dihydrodecoyinine triacetate, and deoxydihydrodecoyinine diacetate, respectively, with a solution of barium nitrite in the presence of glacial acetic acid, there are obtained compounds IA ($X=CH_2=$, $R=OR_1$, $R_1=$—$COCH_3$), IB ($X=CH_3$, $R=OR_1$, $R_1=$—$COCH_3$), and IC ($X=CH_3$, $R=H$, $R_1=$—$COCH_3$), which on deacylation, for example, with methanolic ammonia yield 6-hydroxy-6-desaminodecoyinine 6-hydroxy-6-desaminodihydrodecoyinine and 6-hydroxy-6-desaminodeoxydihydrodecoyinine, respectively.

The nitrous acid for the reactions described above is conveniently generated in situ by adding an alkali metal or alkaline earth metal nitrite to an acid solution of a compound of Formula II. The compound of Formula II is dissolved in any acidic solvent therefor, for example, glacial acetic acid (preferred), propionic, lactic, and the like, and to the solution is added an alkali metal nitrite, for example, sodium and potassium nitrite, or an alkaline earth metal nitrite, for example, calcium and barium nitrite. The reaction can be conducted at temperatures between about 5° and 40° C., advantageously, at about 20° C.

The deacylation is advantageously effected by dissolving the acylated compound in cold methanol saturated with ammonia and allowing the mixture to stand for about 8 to 12 hours at about 0 to 10° C. It can be effected, however, with bases other than ammonia, e.g., alkali metal hydroxides, such as sodium, potassium, and lithium hydroxides, alkaline earth metal hydroxides, such as calcium and barium hydroxides, and alkali metal carbonates, such as sodium and potassium carbonates. [The deacylation can also be effected by using a strongly basic anion exchange resin. Suitable anion exchange resins for this purpose are obtained by chloromethylating by the procedure given on pages 88 and 97 of Kunin, Ion Exchange Resins, 2nd Ed. (1958), John Wiley and Sons, Inc., polystyrene crosslinked, if desired, with divinylbenzene prepared by the procedure given on page 84 of Kunin, supra, and quaternizing with trimethylamine or dimethylalkanolamine by the procedure given on page 97 of Kunin, supra. Anion exchange resins of this type are marketed under the trade names of Dowex 2, Dowex 20, Amberlite IRA-400, Duolite A-102, and Permutit S-1.] Alcohols of from 1 to 4 carbon atoms e.g., methanol, ethanol, propanol, butanol, can be used in the deacylation reaction with methanol being preferred. The novel compounds of the invention, 6-hydroxy-6-desaminodecoyinine, 6-hydroxy-6-desaminodihydrodecoyinine, and 6-hydroxy-6-desaminodeoxydihydrodecoyinine, and their acylates, are useful as intermediates for the preparation of 6-mercaptopurine and 6-methylmercaptopurine which are known anticancer agents. The sequence of these reactions may be shown as follows:

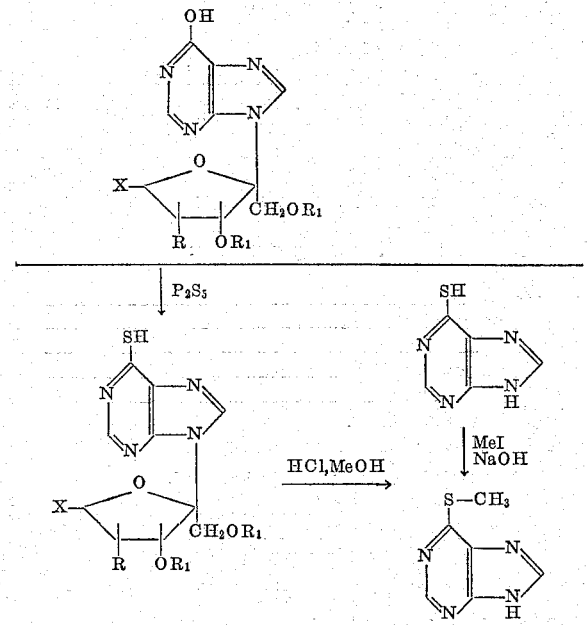

wherein X, R, and $R_1$ are the same as described above. Furthermore, the compounds of the invention are useful in solution or dispersed in plastic films as light filters.

The starting material, decoyinine, is an elaboration product of *Steptomyces hygroscopicus* var. *decoyicus*. A living culture of this organism has been deposited with the Fermentation Division, Northern Utilization Research Branch, U.S. Department of Agriculture, Peoria, Illinois, and has been added to its permanent collection as NRRL 2666. Dihydrodecoyinine triacetate and deoxydihydrodecoyinine diacetate are obtained upon the catalytic hydrogenation of decoyinine triacetate.

The following examples are illustrative of the process and products of the present invention, but are not to be construed as limiting.

PREPARATION OF DECOYININE

A. Fermentation

Agar slants were inoculated with the microorganism Streptomyces hygroscopicus var. decoyicus, NRRL 2666, and incubated for 7 days at 28° C. The slant medium consisted of the following ingredients:

| | Grams |
|---|---|
| Maltose | 10 |
| Tryptone | 5 |
| Dipotassium hydrogen phosphate | 0.5 |
| Sodium chloride | 0.5 |
| Hydrated iron sulfate | Trace |
| Agar | 15 |

Distilled water to make 1 liter.

The spores from one agar slant were used to inoculate 100 ml. of the following sterile seed medium No. 2 in a 500 ml. flask:

| | Grams |
|---|---|
| Glucose | 25 |
| Soy peptone | 10 |
| Corn steep liquor | 3 |
| Yeast extract | 3 |
| N-Z amine A[1] | 2 |
| Ammonium sulfate | 3 |
| Magnesium sulfate | 0.2 |
| Sodium chloride | 0.1 |
| Hydrated iron sulfate | 0.02 |
| Hydrated manganese sulfate | 0.003 |
| Hydrated zinc sulfate | 0.004 |
| Dihydrogen potassium phosphate | 1.9 |
| Monohydrogen potassium phosphate | 1.1 |

Adjusted to pH 7.2 before sterilizing.
Water to make 1 liter.

[1] Enzymatic digest of casein.

The inoculated flask was incubated for 48 hours at 30° C. after which 75 ml. were used to inoculate 12 liters of medium No. 2 in a seed bottle. The seed bottle was incubated for two days at 30° C., agitated with a sweep stirrer at 280 r.p.m., and aerated with 6 standard liters of air per minute. The seed bottle was then used as inoculum for 250 liters of sterile fermentation medium No. 3 having the following nutrients:

| | Grams |
|---|---|
| Kay soy[1] | 30 |
| Ammonium sulfate | 5 |
| Glycerol | 40 |
| Glucose monohydrate | 20 |
| Calcium carbonate | 4 |

Water to make 1 liter.
(pH adjusted to 7.2 before sterilizing.)

[1] Fat-extracted soybean meal, finely milled.

The fermenter was maintained at 30° C. for 4 days during which time it was agitated at 280 r.p.m. and aerated with 100 standard liters of air per minute.

B. Extraction of crude crystalline decoyinine

The whole beer, 250 liters, was adjusted to pH 2.0 with sulfuric acid and filtered with the aid of diatomaceous earth. The filtrate was mixed with 11 pounds of activated carbon and 16 pounds of diatomaceous earth and the mixture was filtered. The clear filtrate was discarded, and the wet cake was eluted three times with 5 gallons of acetone each time to remove the decoyinine. The eluate was heated to 38 to 48° C. to remove acetone. The concentrated aqueous solution (4 liters) was adjusted to pH 7.0 with thirteen ml. of concentrated sulfuric acid and freeze-dried; yield 414 grams of crude decoyinine. The freeze-dried material was dissolved in 2 liters of water at 50° C. and the solution was allowed to cool to room temperature to induce crystallization. The decoyinine crystals had a melting point of 198–200° C.

C. Fractionation of crude crystalline decoyinine

One gram of crystalline decoyinine was fractionated for 150 transfers in a Craig counter-current distribution apparatus using a solvent system consisting of equal parts of n-butanol and water. On evaporating the solvent from the fraction with a K value of 0.705, crystalline decoyinine was obtained as the monohydrate which had a melting point of 124–125° C.; an ultraviolet max. at 262 m$\mu$ in water ($a=57$); an optical rotation $[\alpha]_D^{25}=-41°$ ($H_2O$); and the following elemental analysis:

Calculated for $C_{11}H_{13}N_5O_4 \cdot H_2O$: C, 44.44; H, 5.09; O, 26.91; N, 23.56. Found: C, 44.32; H, 4.94; O, 26.67; N, 23.55.

PREPARATION OF DECOYININE TRIACETATE

To a solution of 2.5 g. of decoyinine in 20 ml. of pyridine at 4° C. was added 8 ml. of acetic anhydride. The mixture was stored overnight at room temperature. On the addition of 3 volumes of ice water (1 to 3° C.) to the mixture, crystallization occurred, yielding 1.65 g. of decoyinine triacetate crystals having a melting point range of 171 to 185° C. Recrystallization from 25 ml. ethanol yielded 1.05 g. of decoyinine triacetate crystals having a melting point of 187 to 188° C.; an ultraviolet maximum in alcoholic 0.01 N sulfuric acid at 258 m$\mu$, $a=56$; and the following elemental analysis:

Calculated for $C_{17}H_{19}N_5O_7$: C, 50.37; H, 4.72; N, 17.28; O, 27.63. Found: C, 50.47; H, 4.62; N, 17.59; O, 27.50.

PREPARATION OF DEOXYDIHYDRODECOYININE AND DIHYDRODECOYININE

Decoyinine triacetate (16.7 grams) and 2 grams of platinum oxide catalyst in 200 ml. of ethanol were shaken two hours in a Parr apparatus with hydrogen at 40 p.s.i. The pressure drop was 3½ to 4 p.s.i. The mixture was filtered and the filtrate was evaporated to dryness and then dissolved in about 50 ml. of ethyl acetate. On the addition of about 5 ml. of Skellysolve B (isomeric hexanes) crystallization occurred. The crystals were recovered by filtration and dried to yield 6 grams of a mixture of dihydrodecoyinine triacetate and deoxydihydrodecoyinine diacetate which melted at 102–105° C. Recrystallization from the same solvent raised the melting point of the mixture to 147 to 149° C. This mixture (3.5 grams) was dissolved in 100 ml. of cold methanol saturated with ammonia. The solution was refrigerated overnight. Crystals which precipitated were recovered by filtration; yield 820 mg. having a melting point of 149–157° C. Evaporation of the filtrate to dryness under vacuum yielded an additional 650 mg. which was combined with the crop obtained by filtration. Distribution of 1.25 grams for 200 transfers in a Craig counter-current apparatus using a solvent system n-butanol:water (1:1) gave two fractions. Fraction A (680 mg.) with a K value of 1.57 was identified as deoxydihydrodecoyinine which had a melting point of 150–153° C. and the following elemental analysis:

Calculated for $C_{11}H_{15}N_5O_3$: C, 49.80; H, 5.70; N, 26.40; O, 18.09. Found: C, 49.64; H, 5.16; N, 26.10; O, 19.78.

Fraction B (200 milligrams) with a K value of 0.64 was identified as dihydrodecoyinine which had a melting point of 205–208° C. and had the following elemental analysis:

Calculated for $C_{11}H_{15}N_5O_4$: C, 46.97; H, 5.38; N, 24.90; O, 22.76. Found: C, 46.89; H, 5.52; N, 24.90; O, 23.50.

PREPARATION OF DEOXYDIHYDRODECOYININE DIACETATE AND DIHYDRODECOYININE TRIACETATE

Acetylation of deoxydihydrodecoyinine and dihydrodecoyinine by the procedure given above for decoyinine triacetate produced deoxydihydrodecoyinine diacetate and dihydrodecoyinine triacetate, respectively.

Other acylates can be prepared in a similar manner by substituting the acetic anhydride by acid chlorides or anhydrides of suitable acids, for example, propionic, butyric, cyclopentylpropyl, phenylacetic, benzoic, o-toluic, m-toluic, and p-toluic acids.

*Example 1.—6-hydroxy-6-desaminodecoyinine triacetate*

To a stirred solution of 20 g. of decoyinine triacetate in 200 ml. of glacial acetic acid was slowly added a solution of 20 g. of barium nitrite in 200 ml. of water. After 16 hrs. at room temperature the solution was evaporated to dryness under high vacuum. The residue was suspended in 80 ml. of water and then extracted twice with 60 ml. of ethyl acetate; 2.12 g. of 6-hydroxy-6-desaminodecoyinine triacetate were obtained by filtration of the aqueuos suspension. The extract was washed once with 100 ml. of cold water, once with 100 ml. of cold 5 percent bicarbonate solution, and 3 times with 100 ml. of water, then dried over sodium sulfate. Upon concentration and cooling, 7.5 g. of 6-hydroxy-6-desaminodecoyinine triacetate were collected. Recrystallization of 1 g. of this material from 15 ml. of ethyl acetate to which 15 ml. of ether was added yielded 750 mg. of 6-hydroxy-6-desaminodecoyinine triacetate melting at 165 to 165.5° C.; having an optical rotation $[\alpha]_D^{25}=+16°$ (c, 0.5 percent in ethanol); and having the following elemental analysis:

Calculated for $C_{17}H_{18}N_4O_8$: C, 50.25; H, 4.46; N, 13.79. Found: C, 50.10; H, 4.05; N, 13.73.

*Example 2.—6-hydroxy-6-desaminodecoyinine*

Ten grams of 6-hydroxy-6-desaminodecoyinine triacetate (prepared as in Example 1) were dissolved in 300 ml. of methanol saturated with ammonia. After one day of storage in the refrigerator, the solution was evaporated to dryness under high vacuum. Upon the addition of 100 ml. of water crystallization occurred, yielding 6-hydroxy-6-desaminodecoyinine crystals.

*Example 3*

By substituting the decoyinine triacetate in Example 1 by decoyinine tripropionate, -tributyrate, -tricyclopentylpropionate, -triphenylacetate, -tribenzoate, and o-, m-, and p-tritoluate, there are obtained the corresponding 6-hydroxy-6-desaminodecoyinine triproprionate, -tributyrate, -tricyclopentylpropionate, -triphenylacetate, -tribenzoate, o-, m-, and p-tritoluate which, if desired, can be deacylated to 6-hydroxy-6-desaminodecoyinine by the procedure of Example 2.

*Example 4*

By substituting the decoyinine triacylates of Examples 1 and 3 by the corresponding acylates of dihydrodecoyinine there are obtained 6-hydroxy-6-desaminodihydrodecoyinine triacetate, -tripropionate, -tributyrate, tricyclopentylproprionate, -triphenylacetate, -tribenzoate, and o-, m-, and p-tritoluate which, if desired, can be deacylated to 6-hydroxy-6-desaminodihydrodecoyinine by the procedure of Example 2.

*Example 5*

By substituting the decoyinine triacylates of Examples 1 and 3 by the corresponding acylates of deoxydihydrodecoyinine, there are obtained the corresponding 6-hydroxy-6-desaminodeoxydihydrodecoyinine diacetate, -dipropionate, -dibutyrate, -dicyclopentylpropionate, -diphenylacetate, -dibenzoate, o-, m-, and p-ditoluate which, if desired, can be deacylated to 6-hydroxy-6-desaminodeoxydihydrodecoyinine by the procedure of Example 2.

I claim:
1. A compound having the following structural formula:

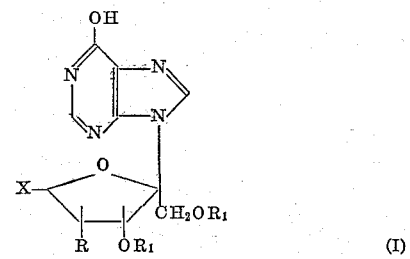

(I)

wherein X is selected from the class consisting of $CH_2=$ and $CH_3—$, R is selected from the class consisting of hydrogen and $—OR_1$ when X is $CH_3$, and $OR_1$ when X is $CH_2=$, and $R_1$ is hydrogen.

2. A compound of Formula I wherein $R_1$ is a saturated hydrocarbon acyl of not more than 8 carbon atoms.

3. 6-hydroxy-6-desaminodecoyinine.
4. 6-hydroxy-6-desaminodecoyinine tri-lower alkanoate.
5. 6-hydroxy-6-desaminodecoyinine triacetate.
6. 6-hydroxy-6-desaminodihydrodecoyinine.
7. 6-hydroxy-6-desaminodihydrodecoyinine tri-lower alkanoate.
8. 6-hydroxy-6-desaminodihydrodecoyinine triacetate.
9. 6-hydroxy-6-desaminodeoxydihydrodecoyinine.
10. 6-hydroxy-6-desaminodeoxydihydrodecoyinine di-lower alkanoate.
11. 6-hydroxy-6-desaminodeoxydihydrodecoyinine diacetate.

12. The process which comprises treating a compound of the formula

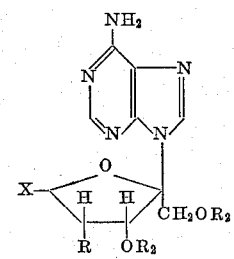

wherein X is selected from the class consisting of $CH_2=$ and $CH_3—$, R is selected from the class consisting of hydrogen and $—OR_2$, and $R_2$ is a saturated hydrocarbon acyl of not more than 8 carbon atoms, with nitrous acid and deacylating the obtained compound to produce a compound according to claim 1.

13. A process which comprises (1) treating a compound of the formula:

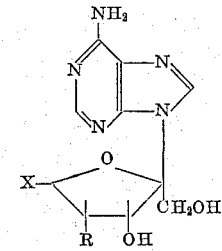

wherein X is selected from the class consisting of $CH_2=$ and $CH_3—$ and R is selected from the class consisting of hydrogen and $—OH$ when X is $CH_3$, and $—OH$ when X is $CH_2=$, with an acylating agent selected from the group consisting of acid halides and acid anhydrides of hydrocarbon carboxylic acids of not more than 8 carbon atoms, to produce a compound of the formula:

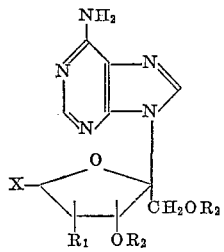

wherein X is as given above, $R_1$ is selected from the class consisting of hydrogen and $-OR_2$ when X is $CH_3$, and $OR_2$ when X is $CH_2=$, and $R_2$ is a saturated hydrocarbon acyl of not more than 8 carbon atoms, (2) treating the obtained compound with nitrous acid to produce a compound of the formula:

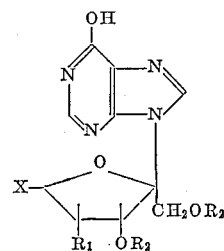

wherein X, $R_1$, and $R_2$ are as given above, and (3) deacylating the obtained compound to produce a compound according to claim 1.

References Cited by the Examiner
UNITED STATES PATENTS

| | | | |
|---|---|---|---|
| 2,876,230 | 3/59 | Folkers et al. | 260—211.5 |
| 3,049,536 | 8/62 | Reiff et al. | 260—211.5 |
| 3,074,930 | 1/63 | Hitchings et al. | 260—211.5 |

LEWIS GOTTS, *Primary Examiner.*